(12) United States Patent
Cragun (10) Patent No.: US 8,493,188 B2
(45) Date of Patent: Jul. 23, 2013

(54) HAPTIC MOTION FEEDBACK DEVICE

(75) Inventor: Brian J Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/353,651

(22) Filed: Jan. 14, 2009

(65) Prior Publication Data

US 2010/0177064 A1    Jul. 15, 2010

(51) Int. Cl.
- *H04B 3/36* (2006.01)
- *G08B 6/00* (2006.01)
- *G09B 21/00* (2006.01)
- *G06F 3/033* (2006.01)
- *G09G 5/08* (2006.01)
- *G09G 5/00* (2006.01)
- *G06F 17/00* (2006.01)

(52) U.S. Cl.
USPC ..... 340/407.1; 340/407.2; 340/4.1; 340/4.11; 340/4.12; 340/4.13; 340/4.14; 345/184; 345/179; 345/161; 345/156; 463/30; 434/112

(58) Field of Classification Search
USPC ............ 340/407.1, 407.2, 4.1–4.14; 345/184, 345/179, 161, 156; 463/130, 30; 434/112
See application file for complete search history.

(56) References Cited

U.S. PATENT DOCUMENTS

| | | |
|---|---|---|
| 7,264,554 B2 | 9/2007 | Bentley |
| 7,427,201 B2 | 9/2008 | Meisner |
| 7,433,885 B2 | 10/2008 | Jones |
| 7,848,543 B2 | 12/2010 | Raghavan et al. |
| 2002/0050923 A1* | 5/2002 | Petersen ............ 340/407.1 |
| 2005/0131924 A1 | 6/2005 | Jones |
| 2005/0186544 A1 | 8/2005 | Raghavan et al. |
| 2007/0052674 A1* | 3/2007 | Culver ............ 345/157 |
| 2007/0091063 A1* | 4/2007 | Nakamura et al. ...... 345/156 |
| 2007/0161263 A1 | 7/2007 | Meisner |
| 2007/0270214 A1 | 11/2007 | Bentley |
| 2007/0298877 A1* | 12/2007 | Rosenberg ........... 463/30 |
| 2008/0226134 A1 | 9/2008 | Stetten et al. |
| 2009/0036212 A1* | 2/2009 | Provancher ........... 463/37 |
| 2009/0063552 A1 | 3/2009 | Jones |
| 2009/0076476 A1 | 3/2009 | Barbagli et al. |
| 2009/0085751 A1* | 4/2009 | Sakama et al. ......... 340/572.7 |
| 2009/0282369 A1 | 11/2009 | Jones |
| 2009/0285407 A1 | 11/2009 | Cragun |
| 2009/0295552 A1* | 12/2009 | Shahoian et al. ........ 340/407.1 |
| 2010/0177065 A1 | 7/2010 | Cragun |

* cited by examiner

*Primary Examiner* — Benjamin C Lee
*Assistant Examiner* — Christopher Gaines
(74) *Attorney, Agent, or Firm* — Patterson & Sheridan LLP (57) ABSTRACT

Embodiments of the present invention include a device and a method for providing a haptic motion feedback to user interacting with a simulated three-dimensional ("3D") environment. In one embodiment, the device includes a base and a belt assembly, coupled to the base. The belt assembly includes a housing having an opening and a belt adapted to rotate within the housing for conveying a motion of an object moving in the simulated 3D environment. To indicate a horizontal component of object's motion, in one embodiment, the base is rotated, thus causing the belt assembly to rotate around its central axis. To indicate a vertical component of the object's motion, in one embodiment, the belt assembly is tilted. Optionally, the belt may include a plurality of protrusions and/or indentations on its surface for indicating to the user distances covered by the object within the simulated 3D environment.

17 Claims, 6 Drawing Sheets

HAPTIC MOTION FEEDBACK DEVICE

BACKGROUND OF THE INVENTION

1. Field of the Invention

The present invention generally relates to simulated three-dimensional ("3D") environments, and more specifically, to assisting a user interacting with a simulated 3D environment in navigating such an environment.

2. Description of the Related Art

Simulated three-dimensional ("3D") environments (such as computer-based simulated environments) have become a standard part of modern life and the World Wide Web. One prominent example of a simulated 3D environment is a 3D virtual world. A virtual world is a simulated environment in which users may inhabit and interact with computer generated characters or with one another via avatars (e.g., graphical representation of individuals within the virtual world). The simulated virtual worlds usually are made to include features that are similar to a real world, e.g., having physical features such as trees, streets, buildings, rooms, hallways, and the like.

Another example of a simulated 3D environment is in the field of video games where, for example, a player manipulates a character within the simulated 3D environment of the video game. However, use of simulated 3D environments is not limited to the web or gaming. For example, in the real estate industry a simulated 3D environment can simulate a walk through of a house, whether the house already exists or has not been built yet.

The simulated 3D environments are largely visual in content delivery, and offer little feedback in the form of alternate modalities (such as tactile, audio, etc.). For example, to determine an avatar's location and/or motion path in a simulated virtual world, the user would often use tools, such as maps, compasses, or simply appearances of a surrounding environment. In other words, objects and their motions within the simulated 3D environments are represented primarily through images and often do not include tactile support.

SUMMARY OF THE INVENTION

The present invention generally provides a device and a method for providing a haptic motion feedback to a user interacting with a simulated three-dimensional ("3D") environment. One embodiment of the invention includes a haptic motion device including a base and a belt assembly coupled to the base. The belt assembly includes a housing having an opening and a belt placed within the housing in such a manner that a surface of the belt may be accessed by the user through the opening. To convey a motion of an object moving about the simulated 3D environment, the belt is rotated within the housing, thus varying which portion of the belt surface may be accessed by the user through the opening.

Another embodiment includes a method for providing a haptic motion feedback to a user interacting with a simulated 3D environment via a haptic motion feedback device. The method includes receiving a signal indicating a motion of an object in the simulated 3D environment. When the motion includes a horizontal motion component, such as moving forward, sideways, and the like, a base of the haptic motion feedback device is rotated to convey the detected horizontal motion. When the motion includes a vertical motion component, such as moving upwards, a belt assembly of the haptic motion device is tilted to convey the detected vertical motion. When the motion includes a velocity component, such change in the object's speed, a rotation speed of the belt located within the belt assembly is adjusted correspondingly. In this manner, the user interacting with the simulated 3D environment is provided with a haptic motion feedback regarding motions of the object.

Yet another embodiment includes a method for adapting motion of an object in a simulated 3D environment using a haptic motion feedback device controlled by a user. The method includes receiving a motion signal representative of a motion of the object in the simulated 3D environment. The motion signal may include one or more of a horizontal motion signal, a vertical motion signal, and a speed change signal.

Horizontal motion signals are generated by the haptic motion feedback device upon the user respectively rotating a base of the haptic motion feedback device. Vertical motion signals are generated by the haptic motion feedback device upon the user respectively tilting a belt assembly of the haptic feedback motion device. Speed change signals are generated by the haptic motion feedback device upon the user respectively adjusting a belt speed of a belt rotatable in a belt assembly of the haptic motion feedback device.

Each generated horizontal or vertical motion signal respectively represents possible horizontal or vertical motions of the object in the simulated 3D environment. Each speed change signal represents a possible speed of the object in the simulated 3D environment. The method further includes adapting motion of the object in the simulated 3D environment upon receiving the motion signal and according to the received motion signal.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide a method and device for providing a haptic motion feedback to a user interacting with a simulated three-dimensional ("3D") environment. More specifically, the embodiments of the present invention enhance the interaction process by providing the user with tactile feedback indicative of motion (e.g., direction and/or velocity) of an object moving within the simulated 3D environment. For example, the device for providing a haptic motion feedback allows a visually-impaired user to "observe"

and/or manipulate objects in the simulated 3D environment, where an object may represent the user, a character in a computer game, a particular avatar, a pointer, an object of the simulated 3D environment and so on.

Figure 1A:
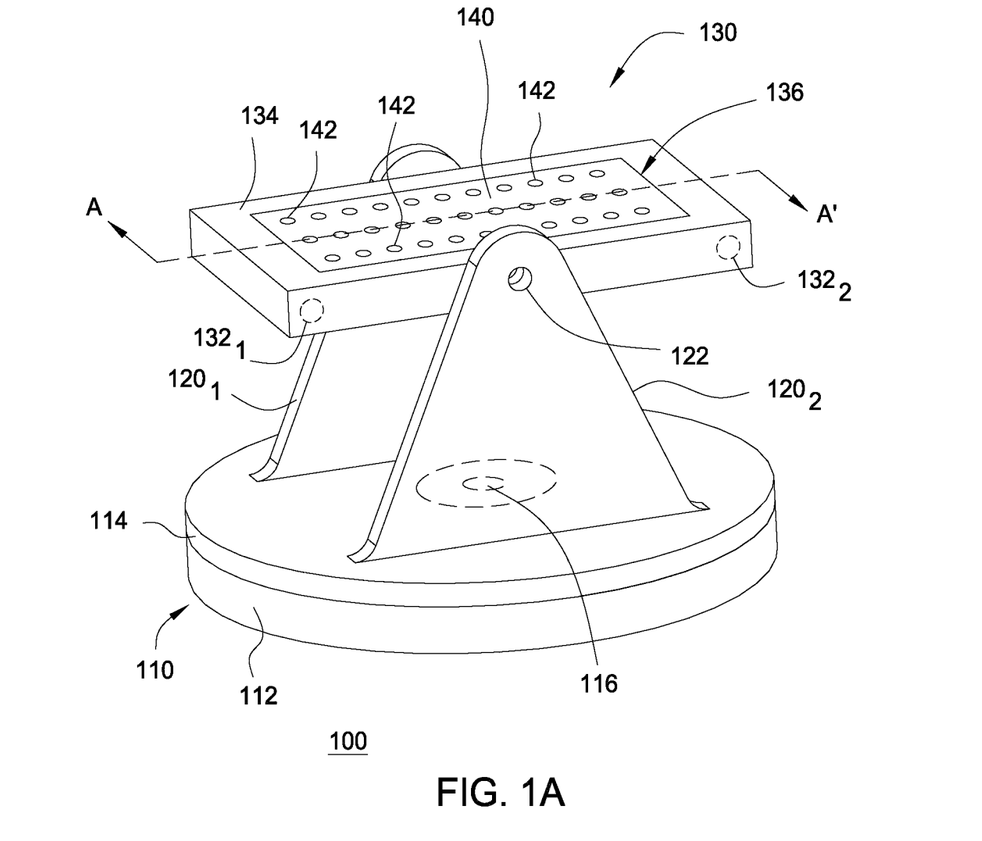
FIG. 1A illustrates a haptic motion feedback device, according one embodiment of the present invention.
Figure 1B:
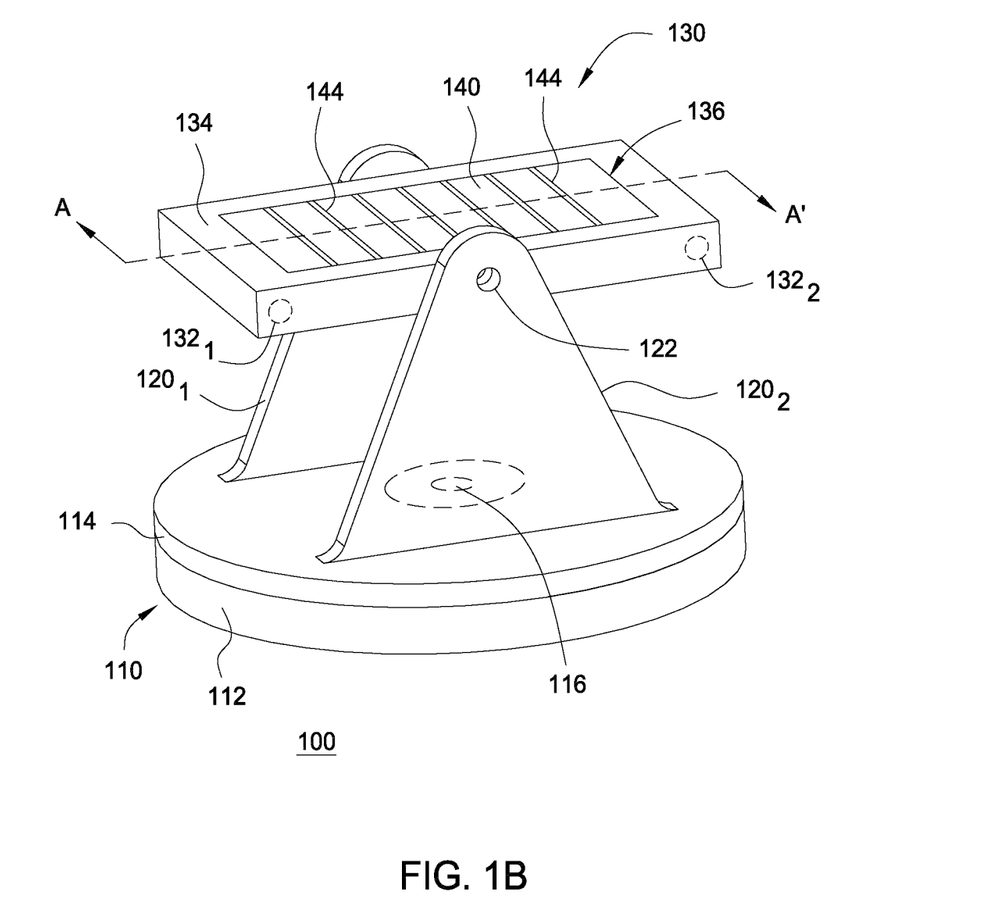
FIG. 1B illustrates a haptic motion feedback device, according to another embodiment of the present invention

FIGS. 1A and 1B illustrate two different embodiments of a haptic motion feedback device 100, according to the present invention. As shown, the haptic motion feedback device 100 includes a base 110, arms $120_1$ and $120_2$ (collectively "arms 120") extending from the base 100, and a belt assembly 130 mounted to the arms 120.

In one embodiment, the base 110 includes two portions 112 and 114 where the portion 114 is rotatably mounted on top of the portion 112, for example, using an axle (not shown). The portion 114 is configured to rotate within a 360-degree range about a central axis 116, while the portion 112 remains substantially stationary. In one embodiment, a servo mechanism is disposed in either portion 112 or portion 114 to control the rotation of the portion 114. Further, in another embodiment, both portions 112 and 114 are substantially stationary. In yet another embodiment, the base 110 includes only one non-rotatable portion.

In the embodiments of FIGS. 1A and 1B, the portions 112 and 114 are similarly shaped. As shown, each portion is circularly disk shaped. Note however, that in alternative embodiments, the portion 112, portion 114, or both are shaped differently (e.g., ovally-shaped, rectangularly-shaped, and so on). Further, in one embodiment one portion is larger than another portion (e.g., the portion 114 is larger than the portion 112).

As mentioned above, the haptic motion device may include two substantially parallel arms $120_1$ and $120_2$ extending from the base 110 (as illustrated, from a surface of the top base portion 114) for mounting the belt assembly 130. In the shown embodiments, the arms $120_1$ and $120_2$ are spaced apart at a distance greater than a width of the belt assembly 130 and each arm 120 includes an axle opening 122. The belt assembly 130 is mounted on an axle (not shown) disposed through the axle openings 122 of the arms $120_1$ and $120_2$. In this manner, the belt assembly 130 may be tilted (pivoted) on the axle. In one embodiment, a servo mechanism is disposed on the axle for controlling tilting of the belt assembly 130. For example, the belt assembly may be tilted to represent a vertical component of an object motion in the simulated 3D environment, such as moving down a hill where the hill's incline corresponds the belt assembly incline created by the controlled tilting.

Typically, an axle opening is centered on a distal end of the arm. However note, that the axle opening may be defined in other portions of the arm (e.g., at the distal end but not centered). Further, while two arms are shown, in one embodiment, the haptic motion feedback device 100 includes only one arm for mounting the belt assembly 130. In yet another embodiment, the belt assembly is coupled directly to the base, i.e., the haptic motion device does not include the arms 120.

Moreover, in one embodiment, the belt assembly 130 is fixed (i.e., not capable of tilting or pivoting). In this embodiment, the belt assembly 130 may be coupled fixedly to one or more arms 120, or alternatively, be coupled directly to the base 110. In the latter embodiment, the haptic motion feedback device does not include arms 120.

The belt assembly 130, as shown, includes a housing 134 having an opening 136. In the illustrated embodiments, the housing 134 is shaped as a rectangular box, while the opening 136 is shaped as a rectangular. However, in one embodiment, the housing 134, the opening 136, or both may be shaped differently (e.g., cylinder shaped housing, opening shaped as an oval, and so on).

Figure 2A:
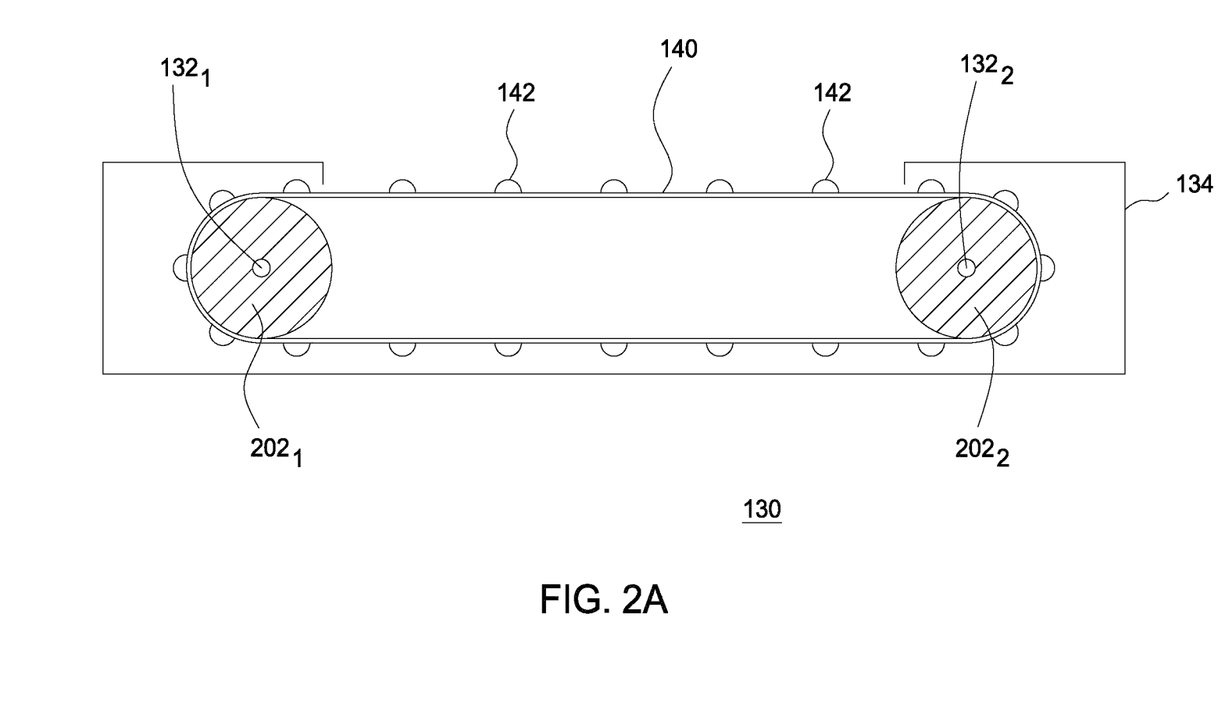
FIG. 2A illustrates a cross-sectional view of a belt assembly illustrated in FIG. 1A, taken along line A-A', according to one embodiment of the invention.
Figure 2B:
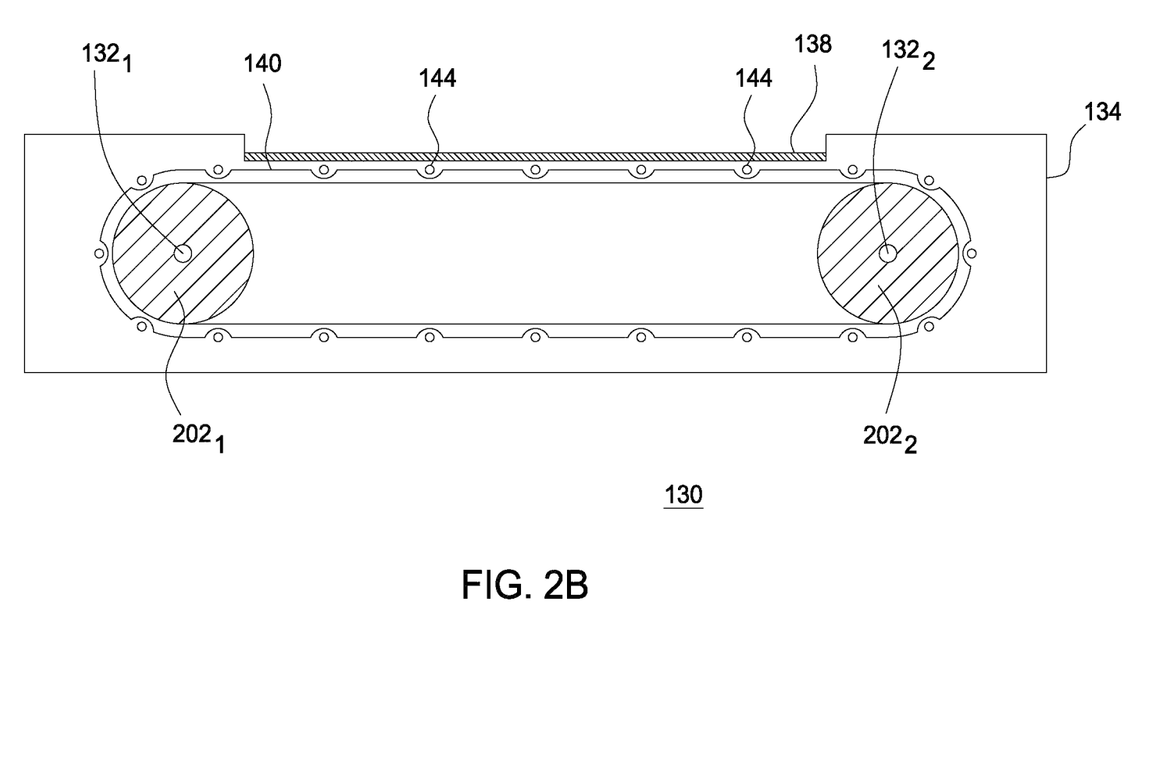
FIG. 2B illustrates a cross sectional view of a belt assembly illustrated in FIG. 1B, taken along line A-A,' according to one embodiment of the invention.

FIGS. 2A and 2B illustrate cross sectional views of the belt assembly 130 illustrated in FIGS. 1A and 1B respectively taken along line A-A'. As shown, the belt assembly 130 further includes a belt 140, such as a length of material, stretched around rollers $202_1$ and $202_2$ (collectively rollers 202) in a continuous loop. The belt 140 and the rollers 202 are placed within the housing in such a manner that a portion of a surface of the belt 140 is accessible for contact to the user through the opening 136, directly (e.g., a user touching the surface of the belt 140) or indirectly (e.g., a user touching a film placed over the surface of the belt 140, such as a protective film 138 illustrated in FIG. 2B, to feel the surface of the belt 140).

In one embodiment, the rollers 202 are positioned at opposite longitudinal ends of the housing 134 and configured to rotate about their central axis $132_1$ and $132_2$ (collectively "axles 132") in such a manner that rotating rollers cause the belt 140 to rotate in any given direction. As the belt 140 rotates, different portions of its surface are accessible for contact to the user via the opening 136. In one embodiment, a motor or servo-mechanism (not shown) controls rotation of the rollers 202. Note, that though two rollers 202 are shown, alternative embodiments include lesser or greater number of rollers (e.g., 1, 3, etc.). Furthermore, in one embodiment, the motor controls rotation of only one of the rollers 202, while other rollers are freely rotatable.

In one embodiment, the belt 140 is made out of non-abrasive material and has a smooth surface. Optionally, the belt 140 may include a plurality of distance points disposed on the surface of the belt 140 for providing the user with relative distance information regarding movements of the object in the simulated 3D environment. For example, as the belt rotates, a user touching the surface of the belt 140 with a finger may feel such distance points passing underneath the finger.

In one embodiment, for example in the embodiment illustrated in FIGS. 1A and 2A, the distance points are evenly spaced protrusions 142 extending from the surface of the belt 140. Though illustrated as being circularly shaped, the protrusions may be configured of any shape (e.g., square). Additionally, in one embodiment, such protrusions are formed as part of the belt material or, alternatively, attached to the surface of the belt 140 while being made of the same or different material. In another embodiment (not shown), the distance points are implemented as evenly spaced indentations in the material of the belt 140 along its surface. In yet another embodiment, the distance points are rollers 144 embedded into the material of the belt 140, substantially collinear along a line that extends across the width of the belt 140. As shown in FIGS. 1B and 2B, the rollers are placed across a width of the belt 140 in a substantially parallel manner and evenly spaced. However, other configurations are possible (e.g., embedding rollers at an angle in relation to sides of the belt).

As the belt 140 rolls, a user touching the surface may feel passing distance points. This provides the user with an opportunity to estimate distances of the object's movements in the simulated 3D environment. As mentioned above, in one embodiment a protective film 138 (e.g., shown in FIG. 2B) is placed over the surface of the belt 140. Typically, the protective film 138 is stretched between sides of the opening 136. In one embodiment, the protective film 138 fully covers a portion of the surface of the belt 140 accessible to the user through the opening 136, so that all contacts between the user and the belt 140 are indirect. By touching the protective cover film 138, the user receives tactile feedback created by the movement of the belt 140 (e.g., from distance points), while avoiding directly touching the moving belt 140.

In one embodiment, one of the distance points is selected as a major distance point. The major distance point typically differs from the other distance points, for example, by being more pronounced than the other distance points. For example, if distance points of the belt 140 are indentations, an indentation representing the major point may have greater size than any other indentation representing a regular distance point. Alternatively, the major distance point may have a different shape than other distance points (e.g., rectangular instead of circular). A contact of the user with the major distance point may indicate to the user that, for example, the belt 140 has made a full loop.

In one embodiment, the haptic motion feedback device 100 may also be used as an input device that controls motions of the object in the simulated 3D environment (e.g., similar to a joystick). For example, by tilting the belt assembly 130, the user may move the object upward or downward in the simulated 3D environment; by rotating the belt assembly 130 about the base 110, the user may cause the object to turn and/or move right or left and so on. In the embodiment having no protective film 138 over the belt 140, the user may cause the object to move forward and backwards and change speed, for example, by pushing the belt of the belt assembly forward or backwards, changing rotation speed of the belt.

Figure 3:
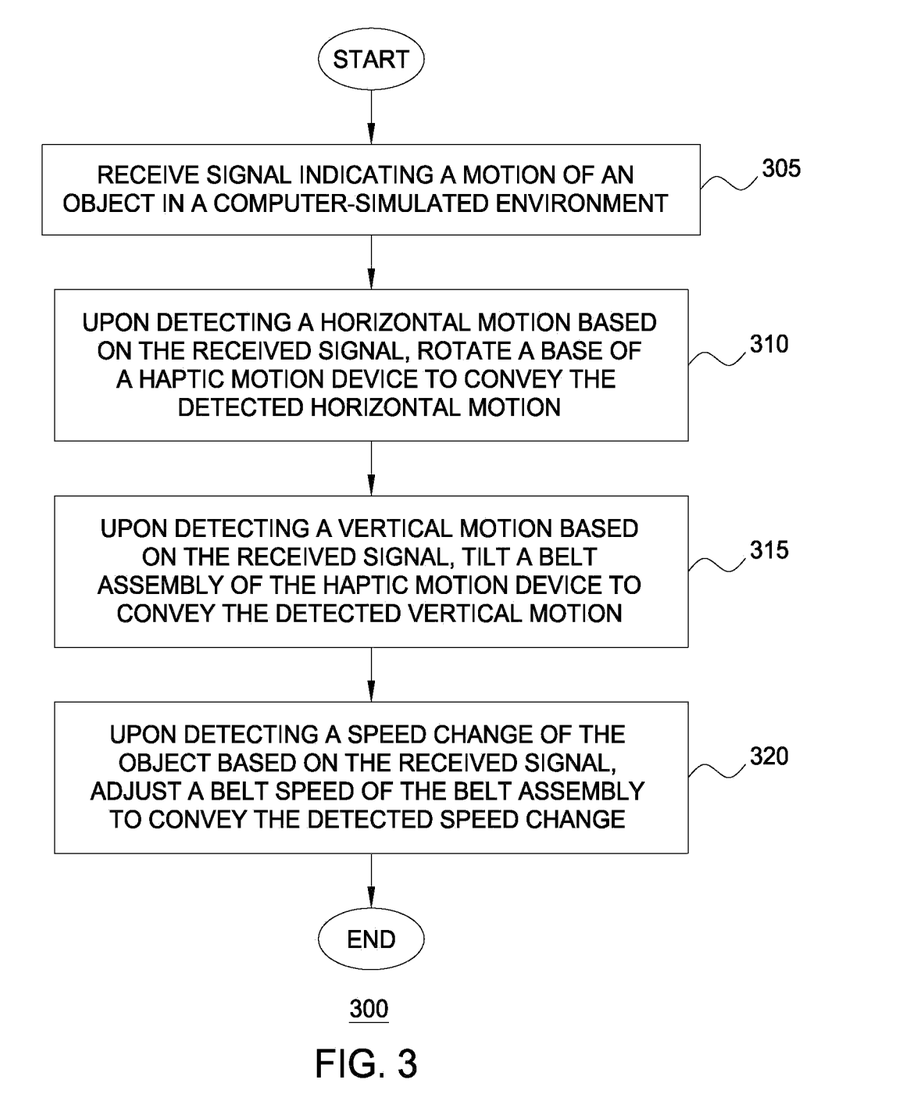
FIG. 3 is a flow diagram illustrating a method for providing a haptic motion feedback, according to one embodiment of the present invention.

FIG. 3 is a flow diagram illustrating a method 300 for providing a haptic motion feedback to a user of a simulated 3D environment, according to one embodiment of the present invention. After initialization, the method 300 proceeds with step 305, where a signal indicating a motion of an object (e.g., moving forward) in a simulated 3D environment is received. Typically, such a signal is provided by a computing device, e.g., a personal computer, a game console, and the like, running the simulated 3D environment.

In one embodiment, each received signal represents one or more components of a particular motion of the object. Such components may include a horizontal component (e.g., the object moving forward, backward, sideways, turns and so on), a vertical component (e.g., the object moving up or down), and a velocity component (e.g., the speed with which the object moves about the simulated 3D environment). For example, if the object is a character moving up a hill in the simulated 3D environment, the signal may include all three components, i.e., horizontal component representing character's motion forward, vertical component representing character's motion upward or downward, and velocity component representing character's speed. In an alternative embodiment, each received signal represents only one component, and thus, each particular motion of the object in the simulated 3D environment is represented by a group of signals.

If, based on the received signal, a horizontal motion is detected, or in other words, the signal includes the horizontal component of the object's motion, then, at step 310, a base of a haptic motion device is rotated to convey such a motion to the user (e.g., as described above with respect to FIGS. 1A and 1B, and in particular, with respect to the base 110 and portions 112 and 114). In one embodiment, the rotation motion of the base made at step 310 corresponds to (i.e., proportional) the horizontal motion of the object. For example, if the object turns left in the simulated 3D environment, the base portion 114 is turned in a similar manner (e.g., both turns are of the same angle and direction).

If, based on the received signal, a vertical motion of the object in the simulated 3D environment is detected, or in other words, the signal includes the vertical component of the object's motion, then, at step 315, a belt assembly of the haptic motion device is tilted to convey such a motion to the user (e.g., as described above with respect to FIGS. 1A and 1B, and in particular, with respect to the belt assembly 130 and arms 120). In one embodiment, the base assembly is tilted correspondingly (i.e., proportionally) to the detected vertical motion. For example, in the example of the object moving up the hill, the tilt of the belt assembly may have the same angle as the incline of the hill.

If, based on the received signal, a change of the object's speed in the simulated 3D environment is detected, or, in other words, the signal includes the velocity component of the object's motion, then, at step 320, a rotation speed of a belt located in the belt assembly is adjusted to convey such a motion to the user (e.g., as described above with respect to FIGS. 1A-2B, and in particular, with respect to the belt assembly 130). In one embodiment, the rotation speed of the belt corresponds (i.e., proportional) to the objects' speed. For example, the rotation speed of the belt may be the same as the speed of the object moving in the simulated 3D environment as displayed by the computing device running the simulated 3D environment.

Additionally, the rotation speed of the belt may be determined by scaling the actual object's speed according to a pre-defined scale. In this manner, the user is provided with relative speed information, e.g., the haptic motion feedback device indicates whether the object moves faster or slower. Furthermore, in one embodiment, the haptic motion device may provide different values of the object's speed (e.g., actual, scaled) depending on specifics of a particular simulated 3D environment and/or circumstances surrounding the object's motions. For example, if the object is a flying plane, the scaled value of the plane's speed is used to adjust the rotation speed of the belt. However, if the object is a snail, the actual speed value is used to adjust the rotation speed of the belt.

Steps 305, 310, 315, and 320 may be repeated for as long as the user is interacting with the simulated 3D environment. In one embodiment, the haptic motion device indicates each component of an object motion to the user independently. In another embodiment, the haptic motion device indicates an object motion as a whole, or in other words, all components of each particular motion of the object are indicated simultaneously, e.g., the belt assembly being tilted at the same time as the base being rotated.

Figure 4:
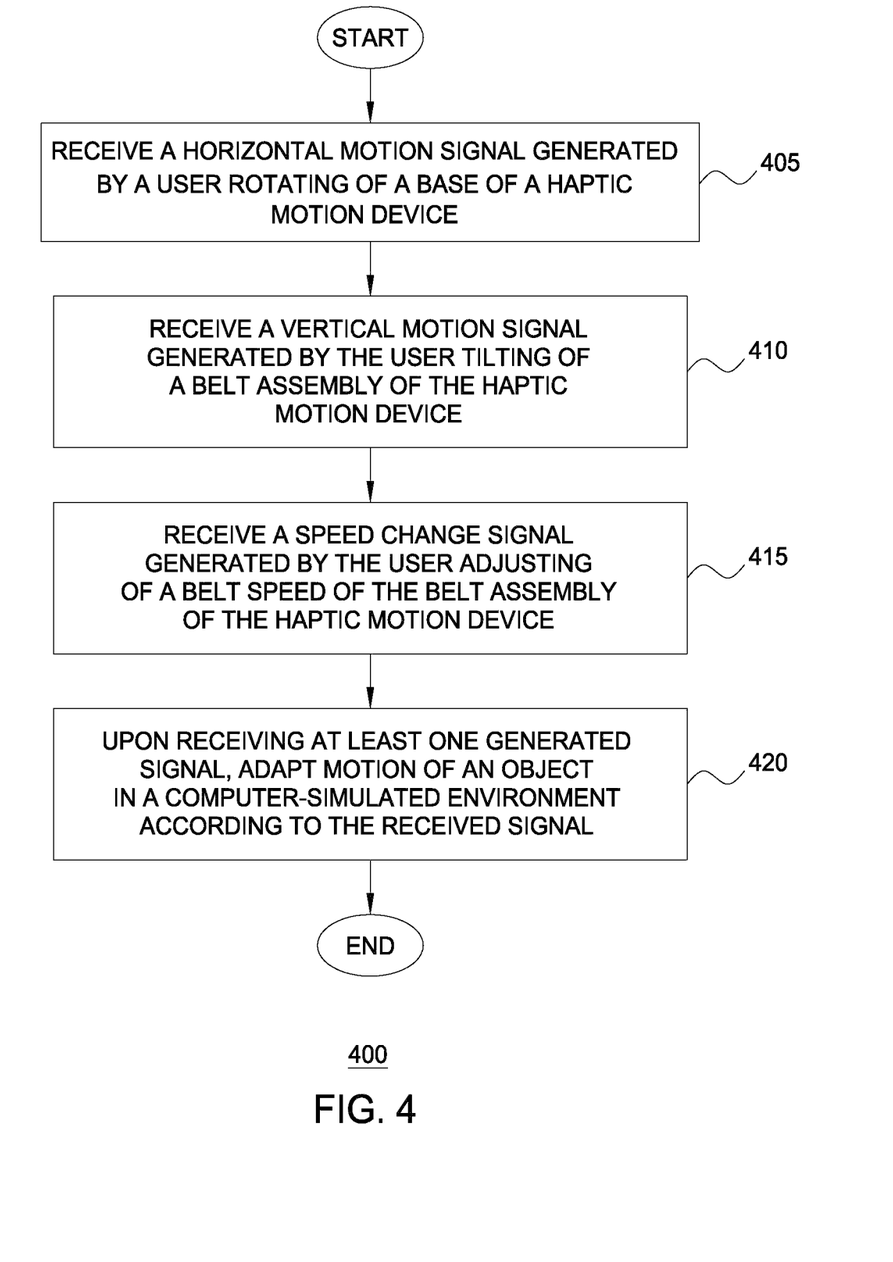
FIG. 4 is a flow diagram illustrating a method for adapting a motion of an object in a simulated three-dimensional ("3D") environment, according to one embodiment of the invention.

FIG. 4 is a flow diagram illustrating a method 400 for adapting motion of an object in a simulated 3D environment, according to one embodiment of the invention. After initialization, the method 400 proceeds with step 405, where a horizontal motion signal is received. In one embodiment, the horizontal motion signal is generated by a haptic motion feedback device in response to a user rotating a base of the haptic motion feedback device, such as a base 110 of the haptic motion devices 100 illustrated in FIGS. 1A and 1B. Typically, the horizontal motion signal represents a horizontal component of a possible motion of the object in the simulated 3D environment. In one embodiment, rotation motions of the base correspond (i.e., proportional) to desired horizontal motions of the object. For example, in one embodiment, to cause the object to turn left in the simulated 3D environment, the base portion 114 of the haptic motion feedback device 100 shown in FIGS. 1A and 1B is turned in a similar manner (e.g., both turns are of the same angle and direction).

At step 410, a vertical motion signal is received. In one embodiment, the vertical motion signal is generated by the haptic motion feedback device in response to the user titling a belt assembly of the haptic motion feedback device, such as the belt assemblies 130 of the haptic motion devices 100 illustrated in FIGS. 1A and 1B. In one embodiment, the belt assembly is tilted correspondingly (i.e., proportionally) to a desired vertical motion. For example, in one embodiment, to cause the object to move up the hill of a certain incline, the belt assembly is tilted at the same angle as the incline of the hill. Alternatively, in another embodiment, tilting the belt assembly at any angle in one direction causes the object to move upward in the simulated 3D environment while tilting the belt assembly at any angle in another direction causes the object to move downward.

At step 415, a speed change signal is received. In one embodiment, the speed change signal is generated by the haptic motion feedback device in response to the user adjusting or changing a belt speed of a belt rotatable within the belt assembly of the haptic motion feedback device, such as the belts 140 of the haptic motion devices 100 illustrated in FIGS. 1A and 1B. In one embodiment, the rotation speed of the belt corresponds (i.e., proportional) to a desired speed of the object. For example, the rotation speed of the belt may be the same as the desired speed of the object moving in the simulated 3D environment as displayed by a computing device running the simulated 3D environment.

In another embodiment, the rotation speed of the belt may be scaled to a desired speed of the object according to a pre-defined scale. In this manner, the user may adjust the object's speed without having to rotate the belt too fast (or too slow). For example, if the object is a flying plane, the scaled value of the rotation speed of the belt may be used to determine the plane's speed. However, if the object is a snail, the actual rotation speed of the belt may be used to determine the snail's speed. In one embodiment, user's manipulation of a motor controlling one or more belt rollers of the belt assembly, such as the rollers 202 shown in FIGS. 2A and 2B, generates one or more signals received by the haptic motion feedback device. In such an instance, the motor is wired in a feedback loop so that manipulation of the motor can be interpreted by a digital controller (not shown) and converted, for further transmission, into one or more signals discussed above.

Typically, the above described signals are provided from the haptic motion device to a computing device, e.g., a personal computer, a game console, and the like, running the simulated 3D environment for further interpretation. In one embodiment, when a user causes multiple signals to be generated simultaneously, e.g., by titling the belt assembly simultaneously with rotating the base, only one signal is transmitted to the computing device. Such a signal represents one or more respective components of a particular motion of the object. The components may include one or more of a horizontal component (e.g., the object moving forward, backward, sideways, turns and so on), a vertical component (e.g., the object moving up or down), and a velocity component (e.g., the speed with which the object moves about the simulated 3D environment).

For example, in one embodiment, to move an object, such as a character, up a hill in the simulated 3D environment, the user would rotate the base to direct the object's horizontal movement (i.e., turn the object toward the hill), tilt the belt assembly to move the object upward (i.e., up the hill) and roll the belt forward at a certain speed to move the object at a speed proportional to the belt speed. Accordingly, in such a scenario, the signal received by the computing device may include all three components, i.e., horizontal component representing character's turn toward the hill, vertical component representing character's motion up the hill, and velocity component representing character's speed. In an alternative embodiment, each transmitted signal represents only one of the described components, and thus, a particular motion of the object in the simulated 3D environment may be represented by a group of signals.

At step 420, the received signals are interpreted by the computing device and motion of the object is adapted according to the received motion signal. Thus, in the above described example, the computing device shows character climbing up the hill. Steps 405, 410, 415, and 420 may be repeated for as long as the user wishes to manipulate the object within the simulated 3D environment.

In this manner, the present invention allows the user to manipulate an object in the simulated 3D environments and/or provides the user with tactile feedback indicative of object's motions in the simulated 3D environment. In this manner, the interaction process of the user with the simulated 3D environment is enhanced. For example, a visually-impaired user can "see" the direction and speed an object, manipulated by and/or representing the user, is going in the simulated 3D environment. Moreover, because a belt of the haptic motion feedback device is made of non-abrasive material and/or covered by a protective film, the device is comfortable to use and may be felt safely by a hand, finger, or another body part.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A haptic motion feedback device for communicating tactile feedback indicative of motion to a user interacting with a simulated three-dimensional ('3D') environment, the device comprising:

A base comprising at least two portions that are stacked, wherein a first portion of the at least two portions is stationary, and wherein a second portion of the at least two portions is adapted to rotate in a 360-degree range about a central axis perpendicular to the second portion, thereby causing rotation of a belt assembly to indicate said motion of the object; and the belt assembly coupled to the base and comprising;
a housing defining an opening;
at least one roller disposed within the housing; and
a belt adapted to roll within the housing, the belt comprising a length of material disposed to roll over the at least one roller and further comprising a plurality of distance points disposed along the length of the material wherein the distance points are structural elements adapted to provide tactile feedback in response to being touched by the user through the opening as the belt moves correspondingly to a motion of an object moving about within the simulated 3D environment, thereby conveying the motion of the object to the user,
wherein the base comprises at least two portions that are stacked, wherein a first portion of the at least two portions is stationary, and wherein a second portion of the at least two portions is adapted to rotate in a 360-degree range about a central axis perpendicular to the second portion, thereby causing rotation of the belt assembly to indicate said motion of the object.

2. The device of claim 1, wherein a portion of the at least two portions is circularly shaped.

3. The device of claim 1, wherein the first portion and the second portion are shaped substantially the same.

4. The device of claim 1, further comprising:
A servo-mechanism disposed in the base for controlling rotation of the second portion about the central axis perpendicular to the second portion.

5. The device of claim 1, further comprising a first arm extending from the base for coupling the belt assembly to the base.

6. The device of claim 5, further comprising a second arm extending from the base, wherein the first arm and the second arm are substantially parallel and spaced apart by a distance greater than a width of the belt assembly.

7. The device of claim 5, wherein the belt assembly is mounted on an axle disposed through an axle opening located at a distal end of the first arm, thereby providing the belt assembly with a capability of being tilted on the axle.

8. The device of claim 7, further comprising:
a servo-mechanism disposed on the axle for controlling the tilting of the belt assembly on the axle.

9. The device of claim 1, further comprising:
a motor for controlling rotation of the at least one roller, wherein the motor is configured to rotate the at least one roller at a speed corresponding to a speed of the object moving about within the simulated 3D environment.

10. The device of claim 1, wherein the material is a substantially non-abrasive material.

11. The device of claim 1, wherein each of the plurality of distance points is one of: a roller embedded in the material substantially collinear along a line that extends across a width of the belt, an indentation in a surface of the material, and a protrusion extending from the surface of the material.

12. The device of claim 11, wherein the plurality of distance points are evenly spaced along the material.

13. The device of claim 11, wherein one of the plurality of distance points is adapted to be a major distance point.

14. The device of claim 13, wherein all of the plurality of distance points other than the major distance point are substantially equally sized and wherein a size of the major point is greater than a size of a remainder of the plurality of distance points.

15. The device of claim 1, wherein the belt assembly further comprises a protective film placed over a portion of the belt between sides of the housing opening.

16. A method for communicating tactile feedback indicative of motion to a user interacting with a simulated three-dimensional ("3D") environment, the method comprising:
receiving a signal indicating a motion of an object in the simulated 3D environment, wherein the user interacts with the simulated 3D environment via the object;
upon detecting a horizontal motion of the object in the simulated 3D environment based on the signal, rotating a base of a haptic motion feedback device according to the detected horizontal motion;
upon detecting a vertical motion of the object in the simulated 3D environment based on the signal, tilting a belt assembly of the haptic motion feedback device according to the vertical motion; and
upon detecting a speed change of the object based on the signal, adjusting a belt speed of a belt adapted to rotate within the belt assembly according to the detected speed change.

17. A method for adapting motion of an object in a simulated three-dimensional ("3D") environment, the method comprising:
receiving motion signal representing motion of the object in the simulated 3D environment, wherein the motion signal has been generated by a haptic motion feedback device controlled by a user, upon receiving any one of:
a horizontal motion signal generated by the user rotating of a base of the haptic motion feedback device, the horizontal motion signal corresponding to an intended horizontal motion of the object in the simulated 3D environment;
a vertical motion signal generated by the user tilting of a belt assembly of the haptic motion feedback device, the vertical motion signal corresponding to an intended vertical motion of the object in the simulated 3D environment; and
a speed change signal generated by the user adjusting of a belt speed of a belt rotatable within a belt assembly of the haptic motion feedback device, the speed change signal corresponding to an intended speed of the object in the simulated 3D environment;
adapting motion of the object in the simulated 3D environment according to the received motion signal.

* * * * *